United States Patent
Edelen, III

(10) Patent No.: US 12,023,869 B2
(45) Date of Patent: Jul. 2, 2024

(54) DETECTING IRREGULARATIES IN LAYERS OF 3-D PRINTED OBJECTS AND ASSESSING INTEGRTITY AND QUALITY OF OBJECT TO MANAGE RISK

(71) Applicant: KAIROS, Inc., Cailifornia, MD (US)

(72) Inventor: David Louis Edelen, III, Charlotte Hall, MD (US)

( * ) Notice: Subject to any disclaimer, the term of this patent is extended or adjusted under 35 U.S.C. 154(b) by 443 days.

(21) Appl. No.: 17/204,755

(22) Filed: Mar. 17, 2021

(65) Prior Publication Data
US 2021/0291458 A1 Sep. 23, 2021

Related U.S. Application Data

(60) Provisional application No. 62/990,508, filed on Mar. 17, 2020.

(51) Int. Cl.
| | |
|---|---|
| *B29C 64/393* | (2017.01) |
| *B29C 64/118* | (2017.01) |
| *B29C 64/209* | (2017.01) |
| *B29C 64/236* | (2017.01) |
| *B29C 64/286* | (2017.01) |
| *B33Y 10/00* | (2015.01) |
| *B33Y 30/00* | (2015.01) |
| *B33Y 50/02* | (2015.01) |
| *G06T 7/00* | (2017.01) |

(52) U.S. Cl.
CPC .......... *B29C 64/393* (2017.08); *B29C 64/118* (2017.08); *B29C 64/209* (2017.08); *B29C 64/236* (2017.08); *B29C 64/286* (2017.08); *B33Y 10/00* (2014.12); *B33Y 30/00* (2014.12); *B33Y 50/02* (2014.12); *G06T 7/0004* (2013.01); *G06T 2207/20036* (2013.01); *G06T 2207/20182* (2013.01); *G06T 2207/30164* (2013.01)

(58) Field of Classification Search
CPC ...................................... B29C 64/393
See application file for complete search history.

(56) References Cited

U.S. PATENT DOCUMENTS

| | | |
|---|---|---|
| 9,724,876 B2 | 8/2017 | Cheverton et al. |
| 2014/0308153 A1 | 10/2014 | Ljungblad |
| 2015/0177158 A1* | 6/2015 | Cheverton ............ B29C 64/393 700/119 |

(Continued)

FOREIGN PATENT DOCUMENTS

WO WO-2018130283 A1 * 7/2018 .............. B22F 10/20

*Primary Examiner* — Suresh Suryawanshi
(74) *Attorney, Agent, or Firm* — Ryder, Mazzeo & Konieczny LLC; Douglas J. Ryder

(57) ABSTRACT

A system for detecting irregularities in three-dimensional parts being manufactured using an additive manufacturing process. Images of the manufactured cross section are obtained via an apparatus, then processed for irregularities as the object manufacturing cycle progresses. These images are processed through computational algorithms in order to identify areas of compromised integrity or quality. This data is then used to determine the risk of the part as manufactured, and an assessment is performed to determine if the process should continue. Should the manufacturing process be determined to proceed, the data is stored to be further assessed later by technicians, operators, and/or engineers.

20 Claims, 11 Drawing Sheets

(56) References Cited

U.S. PATENT DOCUMENTS

| | | | |
|---|---|---|---|
| 2016/0046077 A1* | 2/2016 | Yadroitsau | B23K 26/342 |
| | | | 219/76.12 |
| 2016/0236414 A1 | 8/2016 | Reese et al. | |
| 2018/0297113 A1* | 10/2018 | Preston | B22F 10/16 |
| 2018/0322621 A1* | 11/2018 | Craeghs | G06T 7/001 |
| 2020/0160497 A1* | 5/2020 | Shah | G06T 7/001 |
| 2021/0276264 A1* | 9/2021 | Champion | B33Y 30/00 |
| 2021/0339470 A1* | 11/2021 | Kothari | B29C 64/218 |
| 2021/0356408 A1* | 11/2021 | Yacoubian | G01N 21/9515 |

* cited by examiner

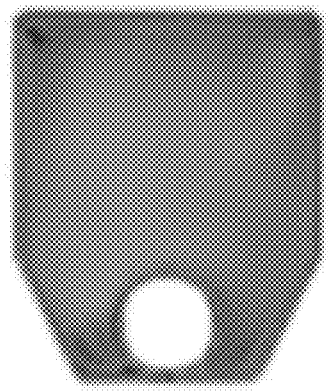
*FIG. 7E*
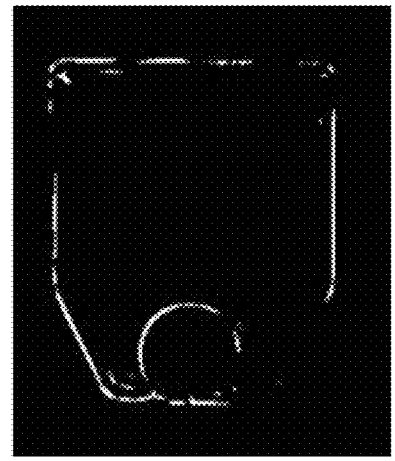
*FIG. 7F*
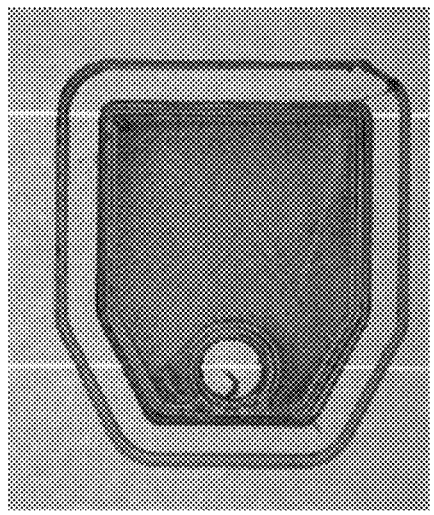
*FIG. 7G*
*FIG. 7H*

DETECTING IRREGULARATIES IN LAYERS OF 3-D PRINTED OBJECTS AND ASSESSING INTEGRTITY AND QUALITY OF OBJECT TO MANAGE RISK

PRIORITY

This application claims the priority under 35 U.S.C. § 119 of Provisional Application Ser. No. 62/990,508, filed on Mar. 17, 2020, entitled "Apparatus and Method for Assessing Layers in Additively Manufactured Parts for Structural Integrity", and having David Louis Edelen III as inventor. Application No. 62/990,508 is incorporated herein by reference in its entirety.

FIELD OF INVENTION

The present invention relates to the field of additive manufacturing, commonly referred to as 3-D printing. More specifically, an apparatus and image processing method to detect irregularities in the layers of an object being 3-D printed and analyze the detected irregularities for safety, integrity (e.g., structural) and/or quality to appropriately manage risk.

BACKGROUND

The additive manufacturing process, widely referred to as 3-D printing, is being called the fourth industrial revolution. Within the realm of additive manufacturing, the American Society of Testing and Materials (ASTM) identifies seven main processes which include material jetting, binder jetting, powder bed fusion, vat polymerization, sheet lamination, material extrusion, and direct energy deposition. Material extrusion based 3-D printing has been one of the most widely adopted technologies and is often called Fused Filament Fabrication (FFF). FFF 3-D printing utilizes thermoplastic materials that are precisely extruded to manufacture a part. This technology was originally intended for manufacturing fast and cheap prototype parts that could be used to confirm fit and function before manufacturing that part via other processes that require significant cost. However, with advancements in material science and the growing understanding of the manufacturing process, FFF 3-D printing is being adapted to manufacture functional, end-use parts that require structural integrity.

At first, thermoplastics such as Polylactic Acid (PLA) or Acrylonitrile Butadiene Styrene (ABS) were most commonly used due to their low cost and relative ease of use. However, the underwhelming characteristics of these materials, such as strength and chemical resistance, limit their practicality for use in more demanding applications. Now, higher performance, more advanced materials such as Polyether Ether Ketone (PEEK), Polyether Ketone Ketone (PEKK), Polyphenylsulphone (PPSU), and Polyetherimide (PEI) that have aerospace and/or medical certifications are being utilized in FFF 3-D printing systems. The advanced materials may be mixed with filler such as glass fiber, carbon fiber, lubricants, and other additives for highly tailored applications. These more advanced materials enable users to manufacture functional parts, or parts that need structural integrity, on demand, with minimal waste or tooling cost. This shift significantly increases the market potential for use applications of the manufacturing process and could be very disruptive to traditional supply chain processes.

The typical FFF 3-D printing technique consist of feeding a thermoplastic filament through a heated extruder to deposit a controlled volume of material along a specified path. The extrusions are deposited onto the heated build platform initially, and then onto itself as subsequent layers of the part are manufactured.

FIG. 1 illustrates an example flow diagram 100 of a typical material extrusion 3-D printer manufacturing an object (e.g., part). The 3-D object to be created is processed through a computer program, commonly known as a slicer, that creates the toolpath instruction for the printer to follow. The toolpath instructions are included in a g-code file that contains all the coordinates of the 3-D part and tells the printer basic settings such as extruder temperatures and delineates the extrusion paths. The g-code file is uploaded into the 3-D printer system 110 and the 3-D printer begins extruding the desired material along the predetermined path to create a cross sectional area of the object (extrudes the object layer by layer) 120. Once a layer has been manufactured, the 3-D printer determines if the object is complete (last layer was extruded) 130. If the object is complete (130 Yes), the 3-D printer is stopped, and the object is removed 140. If the object is not complete (130 No), additional layers need to be printed for the object and the process continues for the next layer 120.

During this manufacturing cycle, the process is assumed to be ideal or perfect, and no monitoring is performed. This is commonly referred to as an open-loop control system. In reality, the manufacturing process is highly complex, making it susceptible to errors and variations, which can highly influence the resulting performance of the part, compromising the structural integrity or quality, and potentially creating a safety hazard.

Additive manufacturing significantly increases the design freedom, allowing complex geometries to be made that could not be manufactured with any previously known methods. With this substantial increase in design freedom, there is also a much greater potential for manufacturing errors. These structural irregularities are the result of unintentional deviations from the planned process or procedure and are typically not accounted for in the anticipated design. In the FFF 3-D printing process, these irregularities can be attributed to commonly known problems such as nonconformities in the extruder flowrate (potentially due to nozzle clogs, unplanned filament diameter changes, incorrect extrusion multipliers, or incorrect extrusion widths), nonconformities in extruder positioning such as inaccurate layer height positioning, deviations in extruder temperature, deviations in the build platform temperature, premature cooling of the previously manufactured layer, or inadequate layer bonding.

For successful adoption of the FFF 3-D printing process for functional parts that require structural integrity, the manufacturing cycle requires strict monitoring and control to ensure consistency, quality, and safety. In the case of a part being used in an aerospace application, a part failure contributed to a structural irregularity could result in significant loss in money, injury, and/or death. This potentially catastrophic result warrants the development of a technology to monitor the manufacturing process, detect irregularities, and assess the risk of the potential flaw.

SUMMARY

The disclosed embodiments are directed to a system for detecting irregularities in FFF 3-D printed parts, or other material extrusion processes, and assessing the risk associated with the presence of that irregularity. Images of the recently manufactured cross section are obtained via camera(s), then processed for irregularities before the object manufacturing cycle continues. These images are processed through computational algorithms, utilizing computer vision and artificial intelligence methods in order to accurately identify areas where the manufacturing process has been compromised. This data is then used to determine the risk of the part as manufactured, and an assessment is performed to determine if the process should continue. Should the manufacturing process be determined to proceed, the data is stored to be further assessed later by technicians, operators, scientist, and/or engineers. This data can be used to check against digital twins or structural analysis, such as Finite Element Analysis (FEA), to determine if there are structural irregularities present in areas of critical stress, ultimately determining if the part is safe for the intended application or are otherwise problematic for the application.

By initializing a monitoring system with the capability of distinguishing irregularities, an accurate assessment of the risk can be evaluated, ultimately determining if a threshold has been reached, deeming the part unsafe, and terminating the manufacturing progress to minimize waste and increase safety. This system performs the assessment after a new layer has been manufactured on the 3-D object. If an irregularity is found, the system will use additional computational analysis to determine the size, location, and frequency of the irregularity for further evaluation.

BRIEF DESCRIPTION OF THE DRAWINGS

The features and advantages of the various embodiments will become apparent from the following detailed description in which:

FIGS. 7A-7H illustrate images of an example layer being captured and processed to identify irregularities, according to one embodiment.

DETAILED DESCRIPTION OF THE EMBODIMENTS

The disclosed embodiments are directed to an apparatus and method for detecting and assessing irregularities in 3-D printed objects for integrity (e.g., structural) and/or quality to appropriately manage risk. More specifically, an image capturing and processing system to determine if a freshly manufactured layer of a 3-D object has inconsistencies in the object that could affect the performance characteristics of the intended design.

As an object is being made via 3-D printing, improper or inaccurate fabrication of object features can occur. This means that during the layer-by-layer progression of the object, flaws or irregularities that will degrade the intended properties can be formed, then subsequently covered over by the next layer, making the irregularity nearly impossible to find after manufacturing is complete. If undiscovered, a major safety hazard may be created. By nature, the FFF 3-D and other additive manufacturing processes, are extremely dynamic. Tiny system programing alterations can cause major influences on performance, or tiny flow characteristic changes can have complex rheological impacts.

Consequently, an apparatus for obtaining layer images for assessing possible irregularities in the 3-D printed object for structural integrity is disclosed. Furthermore, a method is disclosed for processing the images to characterize data to be used to determine the risk level of the object is manufactured, and if it has exceeded predetermined risk thresholds.

Figure 1:
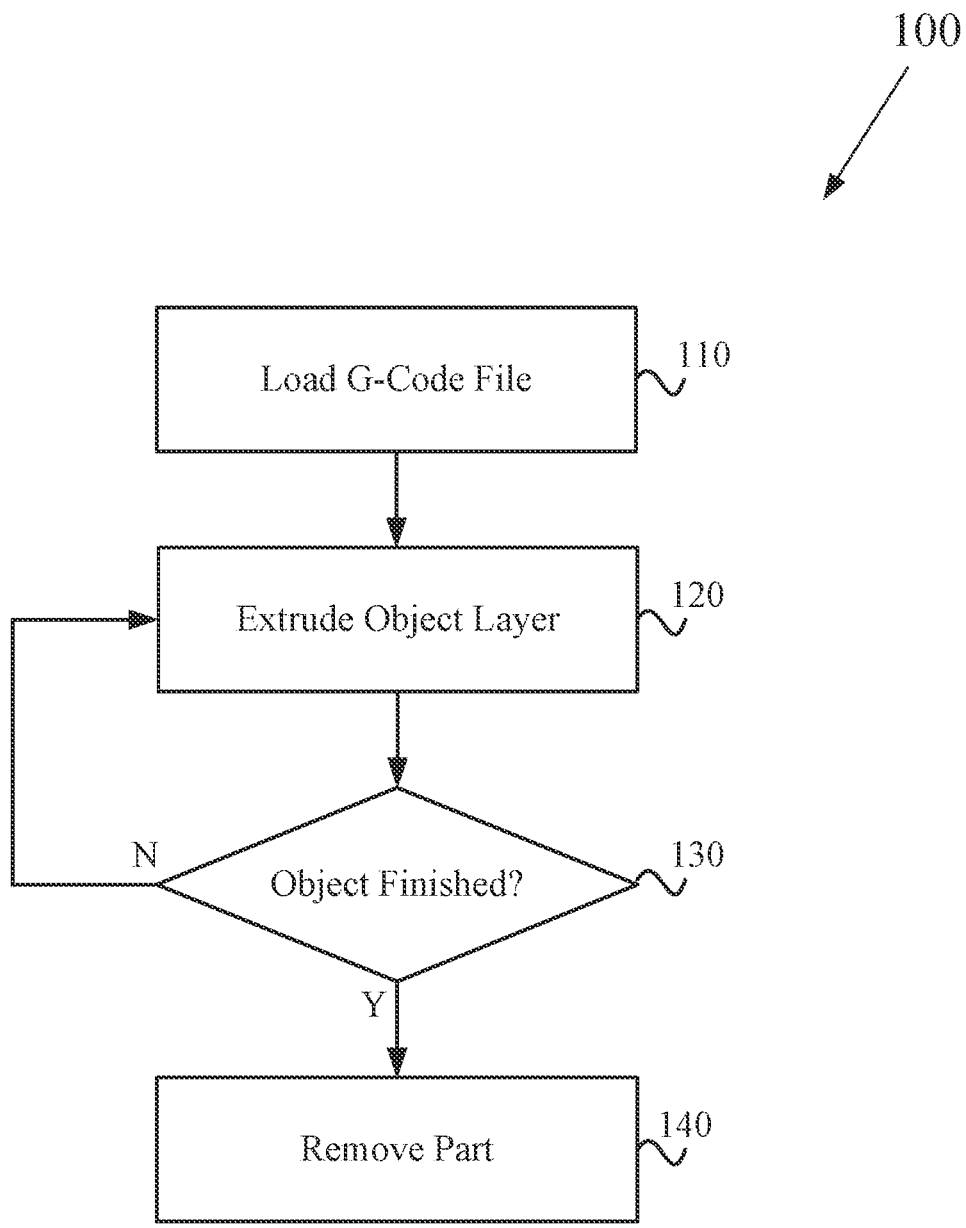
FIG. 1 illustrates an example flow diagram of a traditional material extrusion 3-D printer manufacturing a part.
Figure 2:
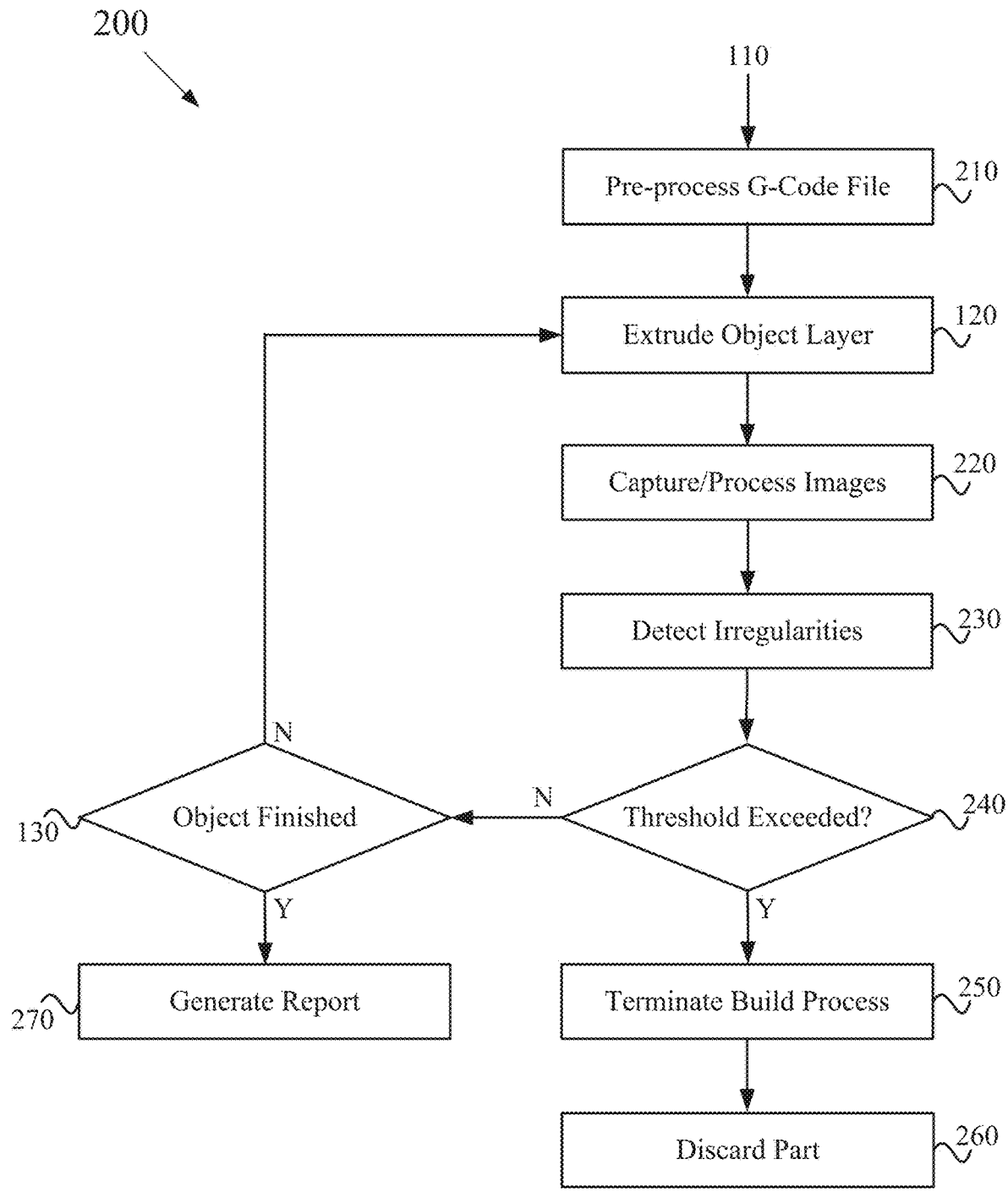
FIG. 2 illustrates an example flow diagram of a material extrusion 3-D printer detecting irregularities during the manufacture of a part, according to one embodiment.

FIG. 2 illustrates an example flow diagram 200 of a material extrusion 3-D printer detecting irregularities or flaws during the manufacture of an object. It should be noted that similar steps to flow diagram 100 are identified with the same reference numbers. The g-code file for the object is processed to create images (e.g., masks) of what each layer of the object should look like when extruded 210. The creation of the masks for each layer will be described in more detail in FIG. 3. After, the mask layers are created, the 3-D printer begins extruding the desired material along the predetermined path to create a cross sectional area (on appropriate layer) of the object 120. Once a layer has been manufactured, the 3-D printer captures and processes one or more images of the layer 220. The images are utilized for detecting irregularities, such as gaps, voids, or flaws, in the layer 230. The coordinates of the one or more irregularities detected are documented along with the images of the layer. The capturing and processing of the images for each layer 220 and utilizing the images to detect irregularities 230 will be described in more detail in FIG. 6.

Assuming that at least one irregularity is detected, a risk assessment is then performed to determine if the at least one irregularity surpasses a predetermined risk threshold 240. The threshold may be a number of irregularities, size of grouping of irregularities, frequency of irregularities contained in different layers of the object, percentage of layer or object containing irregularities and/or the like. If no irregularities were detected in the layer, the risk assessment could be skipped. The risk assessment may be performed for the recently manufactured layer, as well as for all manufactured layers to that point. If the one or more irregularities in the recently manufactured layer, or the accumulation of irregularities in the various manufactured layers surpass the risk threshold (240 Yes), the object fails the risk assessment because the number, size, frequency and/or percentage of the irregularities is too large to produce a safe part at that point in the progression of the manufacturing cycle, even if the remaining progression of the manufacturing cycle proceeded ideally. The manufacturing cycle (build process) is terminated 250 to save material and the object (with however many layers have been printed at that point) is removed and scrapped 260.

If the one or more irregularities in the recently manufactured layer, or the accumulation of irregularities in the various manufactured layers does not reach the risk threshold (240 No), the object passes the risk assessment. If the object is not complete (130 No), the process continues by extruding a next layer 120. When the object is complete (130 Yes), a report is generated for the object that summarizes any irregularities detected for each layer 270. The report may include images of each layer of the object with irregularities, if any, identified along with relevant data such as the coordinates and size of the irregularities. Operators, technicians, scientists, engineers, or the like, can then use this report to check against, for example, structural Finite Element Analysis (FEA) simulations to confirm that structural irregularities are not present in critical areas, or that the detected irregularities will not degrade quality or performance. The object will either be used or scrapped depending on the analysis of the report.

The flow diagram 200 is not limited to the specific steps and specific order described above. Rather steps may be added, deleted, modified, combined, split apart, or rearranged without departing from the current scope. For example, rather than pre-processing the g-code file 210 for all layers prior to extruding an object layer 120 the g-code file may be pre-processed a layer at a time before the layer is extruded.

Figure 3:
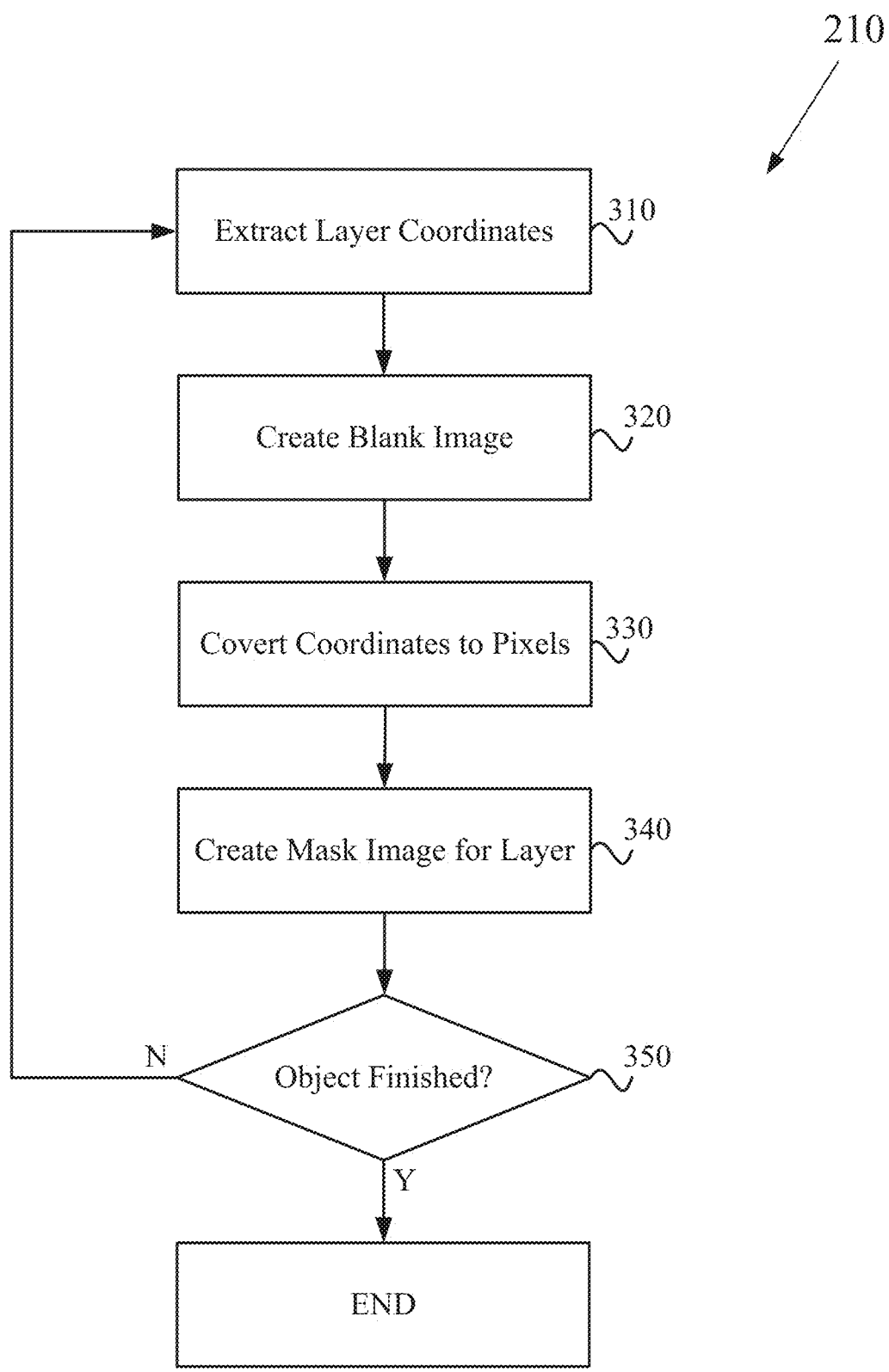
FIG. 3 illustrates an example flow diagram of the processing of the g-code file for the object to create mask images for each layer of the object, according to one embodiment.

FIG. 3 illustrates an example flow diagram of the processing of the g-code file for the object to create mask images for each layer of the object 210. X-coordinates and y-coordinates are extracted for a layer of the object 310. A blank image is created that has same size, pixel resolution, and color channel (e.g., grayscale; Red, Green, Blue (RGB); or Hue, Saturation, Lightness (HSV)) of images that will be captured of the object 320. The physical x-coordinates and y-coordinates of the layer, represented in millimeters, inches, feet, meters, or the like, are converted into camera pixels units (pixel x-coordinates and pixel y-coordinates) 330. This is achieved using a conversion factor derived from elements such as camera resolution, working distance, field of view, focal length of the lens, and the like, to accurately represent the physical object in the image. The blank image will then have the extrusion paths written to it for the layer in pixel units to create a mask image for the layer 340. If the processing of the g-code file for the object is not finished (350 No), then the routine continues and extracts coordinates for a next layer of the object 310. If processing of the object is finished (350 Yes), then the process is complete, and the printer can begin extruding the first object layer.

The flow diagram 210 is not limited to the specific steps and specific order described above. Rather steps may be added, deleted, modified, combined, split apart, or rearranged without departing from the current scope. One or more algorithms may be utilized to perform the processing functions defined above to create mask images for each layer of the object 210. The one or more algorithms can be written in a programming language such as Python, Java, C #, C, C++, R, or the like.

Figure 4A:
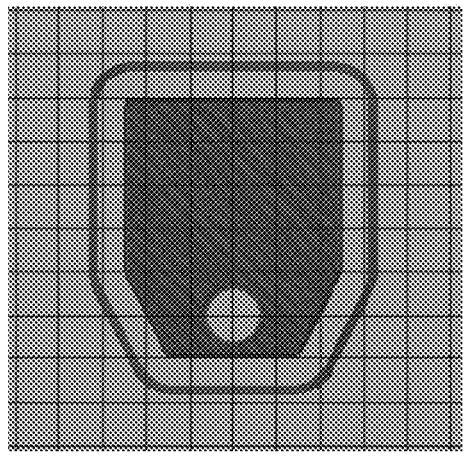
FIGS. 4A-B illustrate images of example physical details of a layer to be extruded and a corresponding mask layer created therefrom, according to one embodiment.
Figure 4B:
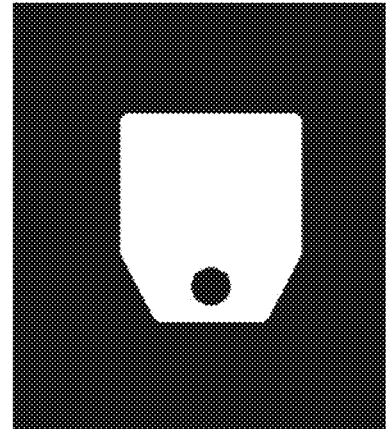
Figure 5A:
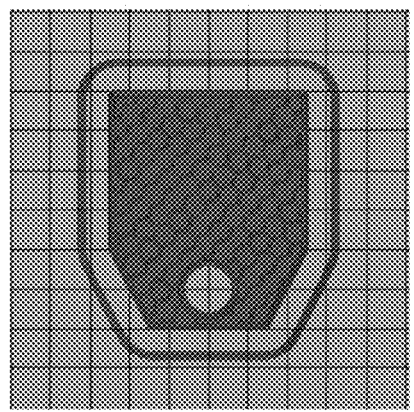
FIGS. 5A-B illustrate images of example physical details of a layer to be extruded and a corresponding mask layer created therefrom, according to one embodiment.
Figure 5B:
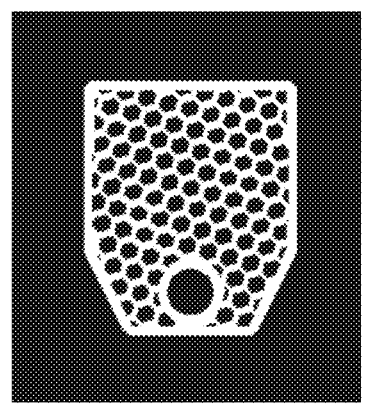

FIGS. 4A-B and 5A-B illustrate images of example physical details of layers to be extruded and corresponding mask layers created therefrom. FIG. 4A illustrates an image of the physical details of a layer shaped as a simple tag that is to be extruded. The ring around the edge of the layer is for ease of extruding purposes (nozzle purge) and is not part of the layer. FIG. 4B illustrates a mask layer that is sized for the image to be captured on the actual layer extruded and includes white pixels for location where material should be in the picture captured. FIG. 5A illustrates an image of the physical details of a tag shaped layer having a honeycomb structure that is to be extruded. The ring around the edge of the layer is not part of the layer. FIG. 5B illustrates a mask layer that includes white pixels for location where material should be located on the layer including where it is located to form the honeycomb structure.

Figure 6:
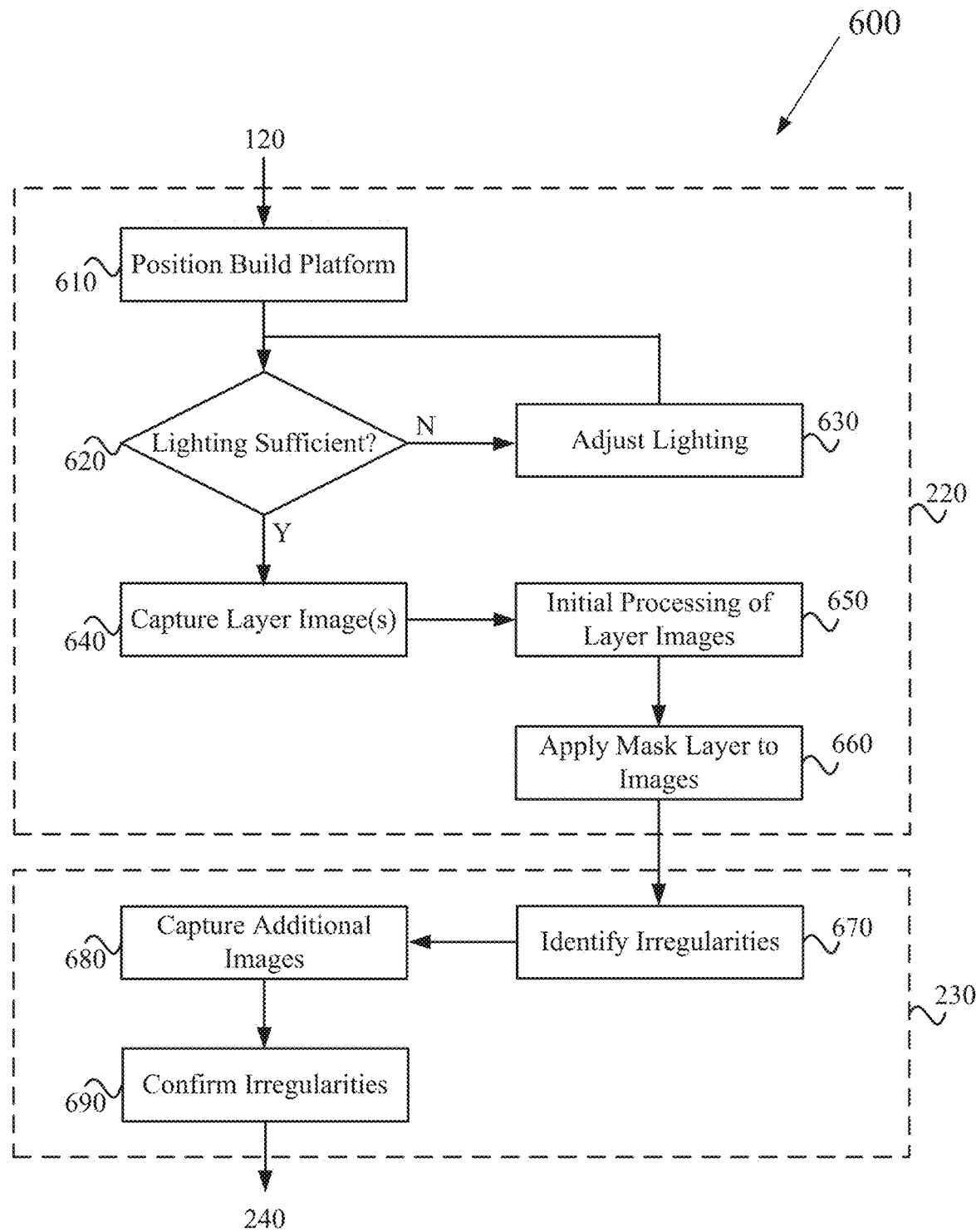
FIG. 6 illustrates an example flow diagram for utilizing images of the layer extruded to detect irregularities, according to one embodiment.

FIG. 6 illustrates an example flow diagram for utilizing images of the layer extruded to detect irregularities 600. The process 600 includes additional processing steps associated with the capturing and processing one or more images of the layer 220 and the detecting irregularities in the layer 230. After each layer of an object has been extruded 120, the 3-D printer positions the build platform so that the layers of the object can be captured by a camera (or other image capturing device) 610. The positioning may include moving the extruder away from the build platform and moving the build platform to be centered with respect to the camera. The positioning may also include a sensor (e.g., a laser, inductive proximity switch, capacitive proximity switch, Hall effect sensor, or the like) to detect if the build platform is in the correct position. The camera may also be attached to the extruder for higher resolution or larger scale objects. The 3-D printer then utilizes sensors to determine if the lighting conditions are sufficient to obtain a precise, high quality image(s) 620. For the computer vison algorithms and artificial intelligence algorithms to determine irregularities, image consistency is critical. If the sensors determine that the lighting is insufficient (620 No), adjustments are made to the lighting (e.g., increase lighting, decreasing lighting, modify color of lighting, modify temperature of lighting, adjust image zoom level) 630.

Once the sensors determine that the lighting is sufficient (620 Yes), one or more images of the layer are captured 640. Depending on the build envelope of the 3-D printer system, a single image may be appropriate for adequately capturing the layer or multiple images may be required. The image(s) of the layer are then processed 650. The processing of the image(s) may include automatic contrast and brightness adjustment (e.g., utilizing statistical and histogram-based methods, or the like) for consistency, a matrix operation to remove distortion caused be lens angles, and/or denoising to smooth out unwanted image details (e.g., using local statistical based methods or the like).

After the images are processed, the mask image for the layer is used to remove the unwanted areas of the image to focus the detection processes on only the area of interest (freshly manufactured layer) 660. The use of the mask layer to remove the unwanted areas (e.g., portion of image(s) associated with previous layers) may be performed through bitwise image arithmetic, or the like.

The image(s) are then processed through a series of operations to identify irregularities in the layer 670. The image processing may include, but is not limited to, color conversion (e.g., color to greyscale, greyscale to color, color to binary, greyscale to binary, or the like), image blurring through a statistics based pixel neighbor operation (e.g., simple average blurring, median blurring, Gaussian blurring, or the like), morphological operations (e.g., erosion, dilation, opening, closing, gradient morphology, top hat morphology, white hat morphology, black hat morphology, or the like), and/or image thresholding (e.g., binary thresholding, inverted binary thresholding, Otsu's Method for thresholding, adaptive thresholding, local thresholding, global thresholding, or the like).

After the irregularities are identified, an additional one or more images from similar and/or different angles are captured 680. The additional images are utilized to confirm the existence of the irregularities 690. The irregularities may be confirmed using methods such as keypoint detectors, whether it be well known algorithms such as Features from Accelerated Segment Test (FAST), Harris, Good Features To Track (GFTT), Difference of Gaussians (DoG), FAST Hessian, Scale-Invariant Feature Transform (SIFT), RootSIFT, Speeded Up Robust Features (SURF), Binary Robust Independent Elementary Features (BREIF), Oriented FAST and rotated BRIEF (ORB), Binary Robust Invariant Scalable Keypoints (BRISK), binary feature extraction, kernel-based pixel computational methods, Recurring Neural Networks (RNN), Convolutional Neural Networks (CNN), machine language algorithms or the like. If the irregularities are confirmed the process proceeds to the risk assessment 240 of FIG. 2.

If no irregularities were identified, the capturing different images 680 and the confirmation of the irregularities 690 may be skipped and the process may proceed to determining if the object is complete (130 of FIG. 2). Likewise, if the irregularities were not confirmed the process may proceed to determining if the object is complete (130).

The flow diagram 600 is not limited to the specific steps and specific order described above. Rather steps may be added, deleted, modified, combined, split apart, or rearranged without departing from the current scope. For example, rather than applying a mask layer to identify the current manufactured layer in order to remove previously manufactured layers from the image 660 other methods, potentially more complicated, could be utilized to determine the most recent manufactured layer and remove other portions of the image.

Figure 7A:
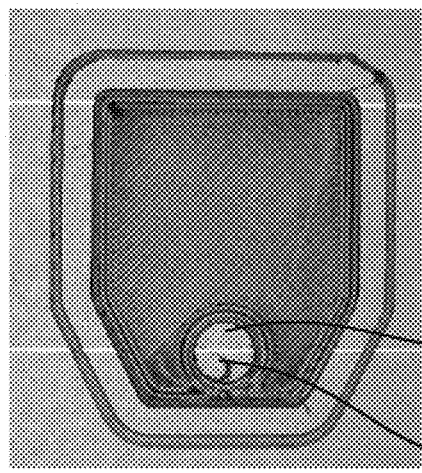
Figure 7B:
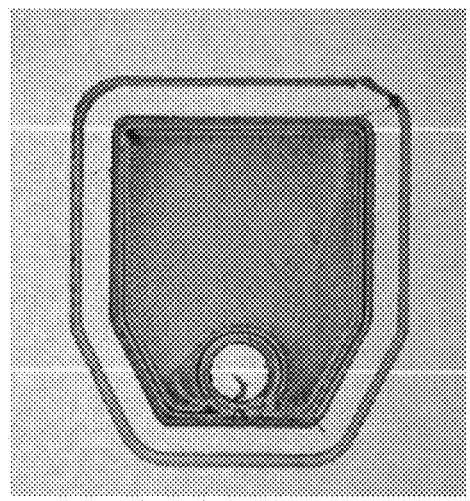
Figure 7C:
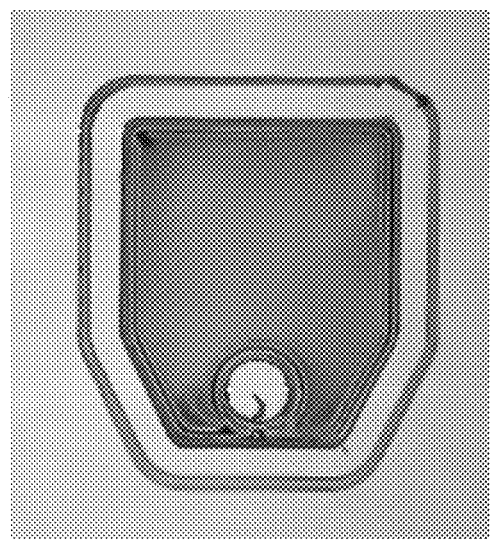
Figure 7D:
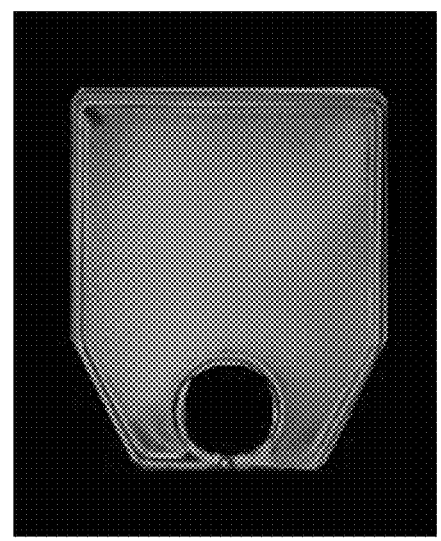

FIGS. 7A-7H illustrate images of an example layer being captured and processed to identify irregularities. FIG. 7A illustrates an image captured of the layer that was extruded (640). FIG. 7B illustrates the captured image of FIG. 7A after the brightness and contrast have been adjusted (650). FIG. 7C illustrates the brightness/contrast adjusted image of FIG. 7B after it has been denoised (650). FIG. 7D illustrated the denoised image of FIG. 7C after the mask for that layer has been applied to remove anything captured in the image not associated with the layer, including previous extruded layers (660). It should be noted that the shard 710 within the hole 720 visible in FIGS. 7A-7C (but only labeled in FIG. 7A for ease of illustration) has been removed since that irregularity was from a previous layer.

FIG. 7E illustrates the masked image of FIG. 7D after it has been blurred and gray scaled (670). FIG. 7F illustrates the blurred/grayscale image of FIG. 7E after black hat morphology and binary thresholding have been performed thereon (670). The white in the image of FIG. 7F are the irregularities (e.g., voids) in the layer. FIG. 7G illustrates the irregularities from FIG. 7F being imposed on the captured image. FIG. 711 illustrates an analysis to identify the percentage of voids in the layer (e.g., 1.07% as illustrated) and the location of the voids in physical dimensions (converted from pixel dimensions). As illustrated, the percentage of voids was simply calculated as the number of pixels identified as voids in FIG. 7F divided by number of pixels in the mask (e.g., FIG. 4B). The analysis is in no way intended to be limited thereby. Rather, the analysis may be performed in various manners without departing from the current scope. The analysis may be used in deciding whether a threshold has been exceeded (e.g., 240).

Figure 8A:
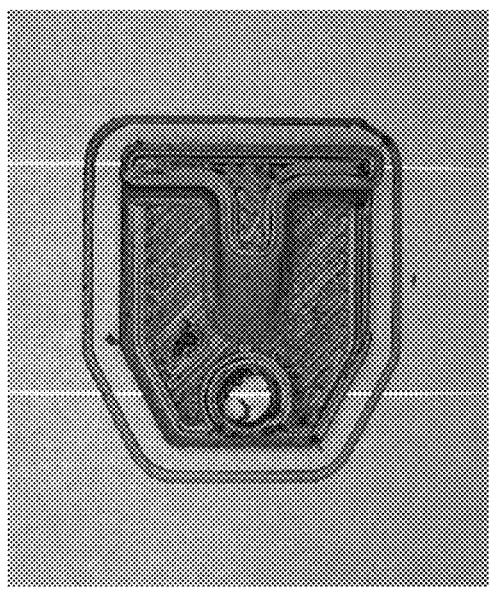
FIGS. 8A-B illustrate an example captured image of an object and the captured image after a mask for most recent layer has been applied, according to one embodiment.
Figure 8B:
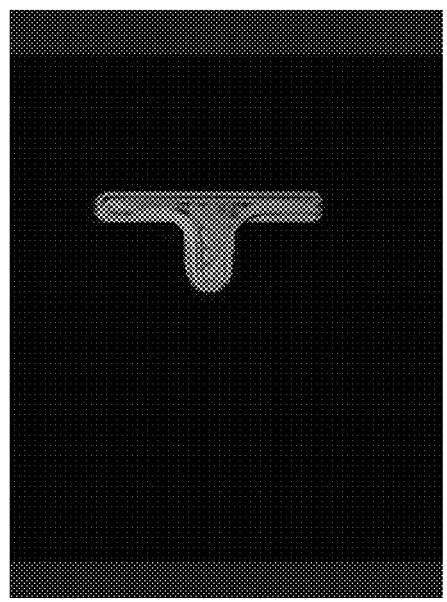

FIGS. 8A-B illustrate an example captured image of an object and the captured image after a mask for most recent layer has been applied. FIG. 8A illustrates an image captured for an object after a layer has been extruded. As illustrated, the object includes a T-shaped portion that is raised above other portion thereof. As the T-shaped portion is raised it is likely that this is the layer that was extruded and would be the layer that irregularities would be looked for as the other layers would have already been processed. FIG. 8B illustrates the captured image after the mask for the layer is applied so that simply the T-shaped portion is analyzed for irregularities.

Figure 9A:
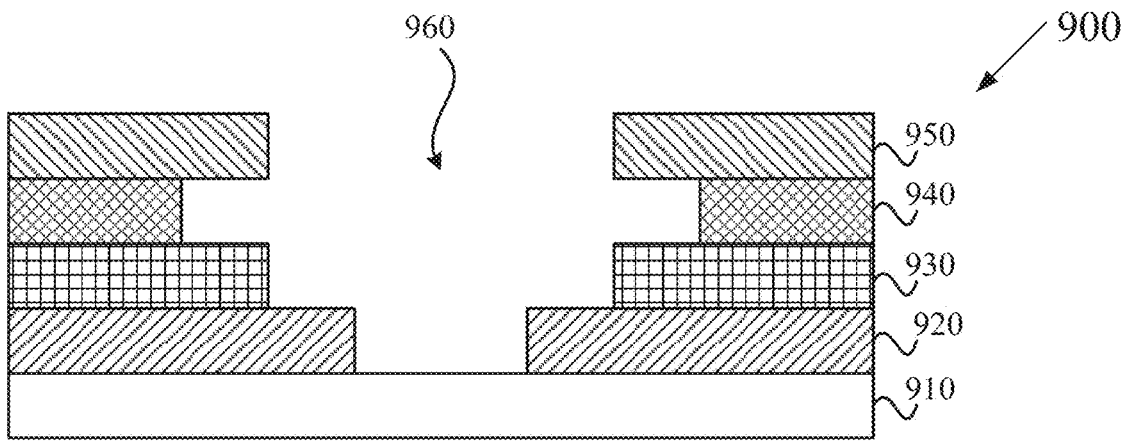
FIGS. 9A-F illustrate the use of mask layers created from the g-code file to remove unwanted portions of the image captured, according to one embodiment.
Figure 9B:
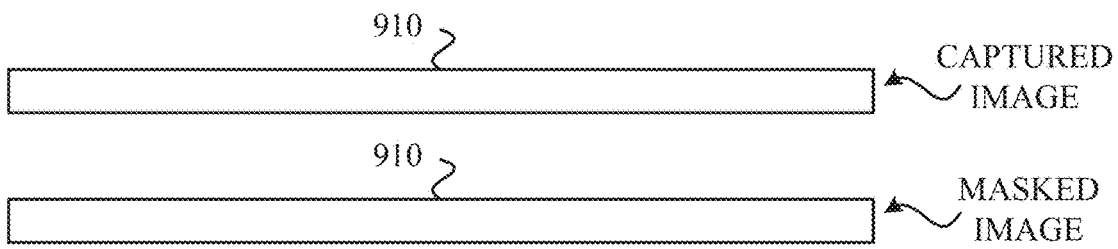

FIGS. 9A-F illustrate the use of mask layers created from the g-code file to remove unwanted portions of the image captured. FIG. 9A illustrates a side view of an object 900 to be created that includes a plurality of layers 910-950 where the layers form a shaped opening 960 within the object 900. FIG. 9B illustrates an image that would be captured after the first layer 910 was extruded and the image after a mask associated with the first layer was utilized. As illustrated, the captured image and the masked image are identical.

Figure 9C:
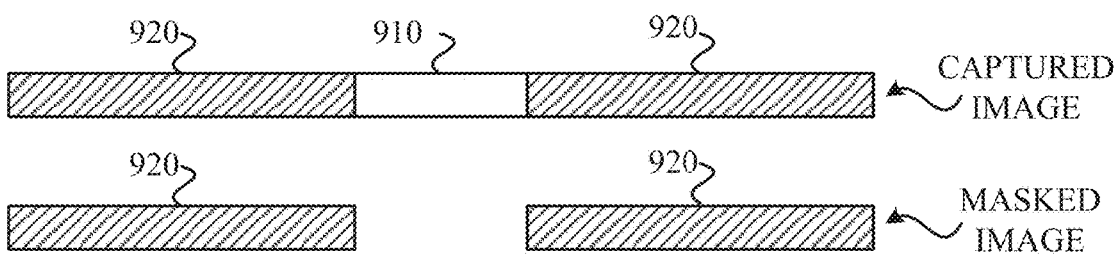
Figure 9D:
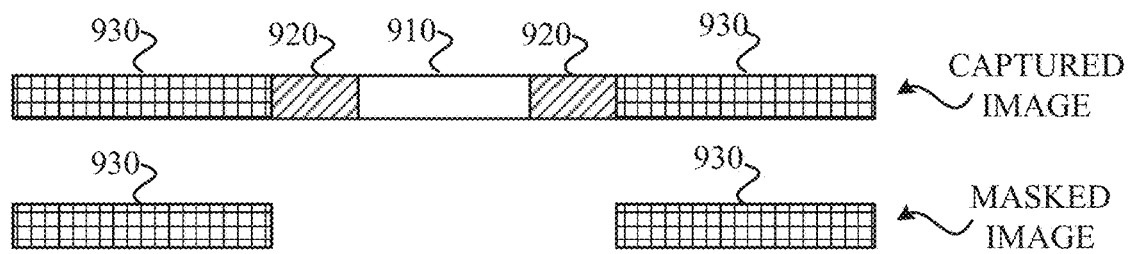

FIG. 9C illustrates the captured and masked images after the second layer 920 was extruded. The captured image includes the second layer 920 and the first layer 910 that was not covered by the second layer 920. Utilizing the second layer mask removes the first layer 910 from the masked image so only the second layer 920 is considered. FIG. 9D illustrates the captured and masked images after the third layer 930 was extruded. The captured image includes the third layer 930, a portion of the second layer 920 not covered by the third layer 930, and a portion of the first layer 910 not covered by the second or third layers 920, 930. Utilizing the third layer mask removes the first and second layers 910, 920 from the masked image so only the third layer 930 is considered.

Figure 9E:
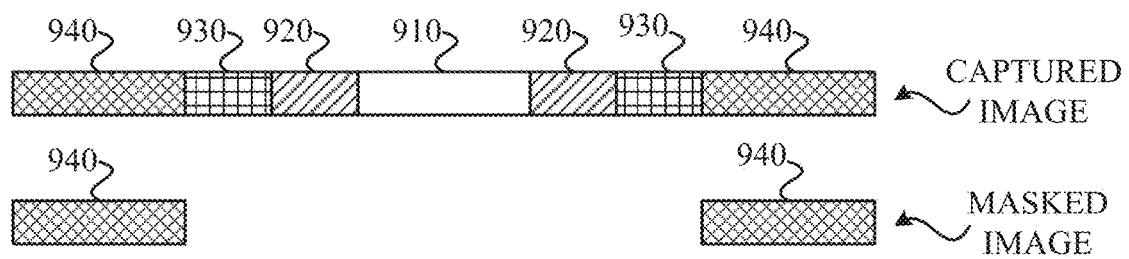
Figure 9F:
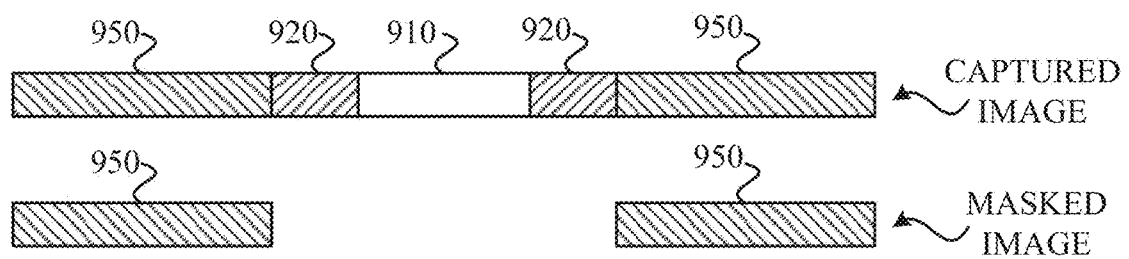

FIG. 9E illustrates the captured and masked images after the fourth layer 940 was extruded. The captured image includes the fourth layer 940, a portion of the third layer 930 not covered by the fourth layer 940, a portion of the second layer 920 not covered by the third or fourth layers 920, 930 and a portion of the first layer 910 not covered by the second, third or fourth layers 920, 930, 940. Utilizing the fourth layer mask removes the first, second and third layers 910, 920, 930 from the masked image so only the fourth layer 940 is considered. FIG. 9F illustrates the captured and masked images after the fifth layer 950 was extruded. The captured image includes the fifth layer 950, a portion of the second layer 920 not covered by the fifth layer 950 and a portion of the first layer 910 not covered by the second or fifth layers 920, 950. Utilizing the fifth layer mask removes the first and second layers 910, 920 from the masked image so only the fifth layer 950 is considered.

Figure 10:
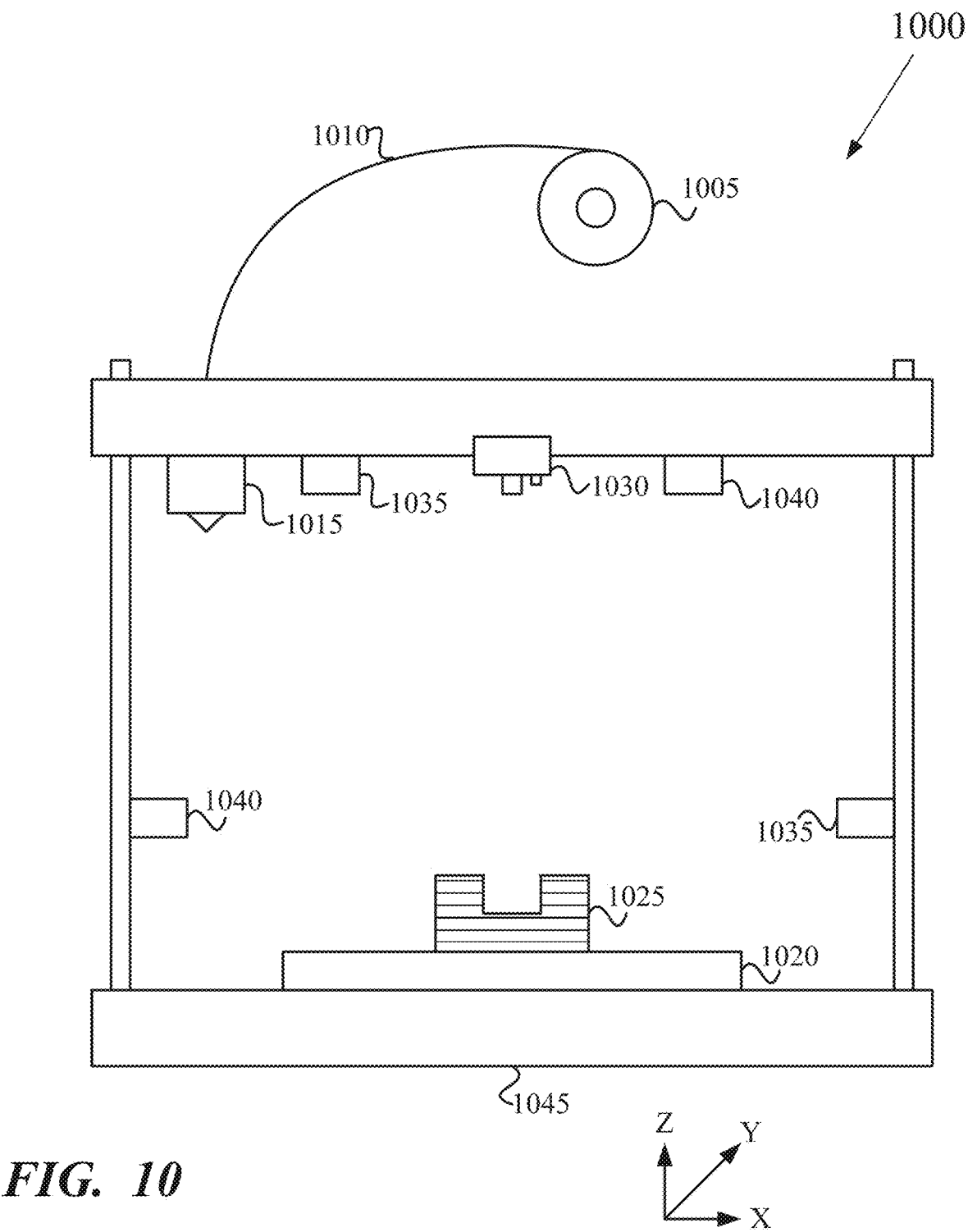
FIG. 10 illustrates a block diagram of an example 3-D printer having an apparatus to obtain the layer data to be processed by the system to determine structural integrity, according to one embodiment.

FIG. 10 illustrates a block diagram of an example 3-D printer 1000 to capture images of each layer in order to detect irregularities and determine if a threshold has been exceeded. The FFF 3-D printer 1000 includes a spool 1005 of thermoplastic filament 1010 or the like that is supplied to an extruder 1015. The extruder 1015 heats the filament 1010 to a liquid state and extrudes the liquid filament onto a build platform 1020 according to the g-code file to create a 3-D object 1025 layer by layer. After each layer is extruded, images are captured and analyzed to detect irregularities and evaluate the risk of the object being manufactured. In order to capture the images, the extruder 1015 is positioned to be out of the way of an image capturing device (e.g., camera) 1030 and the build platform 1020 is positioned in the correct position for the image capturing device 1030 to capture the necessary images.

The 3-D printer 1000 is also equipped with light sensing devices 1035 located throughout the build envelope to determine if image capturing conditions need adjustments.

The sensors 1035 are illustrated as being located on an upper left side and right wall but are not limited thereby. Upon the lighting conditions requiring adjustments, additional lights 1040, various color lights, various temperature lights, or the like located throughout the build envelope can be utilized for optimal image quality. The additional lighting 1040 is illustrated as being located on an upper right side and a left wall but is not intended to be limited thereto. The 3-D printer 1000 further includes a base 1045, with an enclosure to house the controlling electronics or the like.

While not illustrated, the 3-D printer 1000 includes a processor in communication with processor readable storage medium. The processor readable storage medium may be part of the processor, may be separate from the processor, or a combination thereof. Instructions may be stored in the processor readable storage medium that when read and executed by the processor cause the processor to control the operation of the 3-D printer. The processor may further receive instructions from a computer that communicates with the 3-D printer 1000. The processor may execute instructions that are stored in processor readable storage medium on the computer that communicates with the 3-D printer.

The processor may instruct the various parts of the 3-D printer 1000 to manufacture the object based on the g-code file provided thereto. The processor may instruct the various parts of the 3-D printer 1000 to perform the various process flows 200, 210, 600 described above, or modifications of those processes, to detect irregularities in the manufactured object on a layer-by-layer basis and determine if a threshold level is exceeded where the object being manufactured should be discarded.

The 3-D printer 1000 may provide various information captured during the manufacturing of the object, including but not limited to images captured for each layer, the mask for each layer, and/or information regarding the irregularities detected for each layer, to the computer for the computer to store the information in its memory. The 3-D printer 1000 may include memory to store certain information.

The disclosure focused on FFF material extrusion to generate structural objects. However, the disclosure is not limited to the extrusion of structural objects. Rather the disclosure could clearly be expanded to cover the extrusion of other objects. For example, material extrusion bio-printing is an up-and-coming field. Using a process similar to the FFF process, biological cell filled mediums are extruded through controlled dispersion out of a syringe to create bio-parts such as skin, ear lobes, and other biological features. This is extremely attractive to the medical community due to the difficulty of getting compatible organs from donors and the time it may take to find them. The detection of irregularities on a layer-by-layer basis and determination of when a threshold has been exceeded is clearly applicable to this extrusion method as well. The detection and analysis of irregularities may be utilized to detect whether the object is susceptible to infection or has sufficient structural integrity for the intended purpose.

The disclosure focused on FFF or material extrusion based additive manufacturing methods but is intended to be limited thereto. Rather, the disclosure could be implemented in other 3-D printing methods such as material jetting, binder jetting, powder bed fusion, vat polymerization, sheet lamination, or direct energy deposition and the like.

Although the disclosure has been illustrated by reference to specific embodiments, it will be apparent that the disclosure is not limited thereto as various changes and modifications may be made thereto without departing from the scope. The various embodiments are intended to be protected broadly within the spirit and scope of the appended claims.

The invention claimed is:

1. A method for detecting irregularities during manufacture of an object, using a three-dimensional (3-D) printer, the method comprising
   providing toolpath instructions for the object, wherein the toolpath instructions provide physical coordinates for the 3D printer to provide material for each layer of the object;
   creating a mask for each layer of the object by converting the physical coordinates for the 3D printer to pixels based on images to be captured for each layer of the object;
   manufacturing a layer of the object;
   capturing at least one image of the object after the layer is extruded;
   utilizing the mask for the layer to exclude any part of the at least one image not associated with the layer to create a masked image for the layer;
   processing the masked image to detect any irregularities in the layer;
   determining if the irregularities in the layer or total number of irregularities in the object exceed one or more defined thresholds, wherein the one or more defined thresholds are associated with a risk assessment of structural integrity associated, with functional requirements of the object; and
   continuing the extruding, capturing, processing and determining until the manufacture of the object is complete or at least one of the one or more defined thresholds is exceeded.

2. The method of claim 1, wherein the manufacturing includes extruding the layer of the object.

3. The method of claim 1, wherein the capturing is performed with a camera.

4. The method, of claim 1, further comprising pre-processing the captured image prior to the utilizing the mask to ensure consistency between images and remove unwanted details.

5. The method of claim 1, wherein the processing the masked image includes at least some subset of color conversion, image blurring, morphological operations and image thresholding.

6. The method of claim 1, further comprising configuring the 3-D printer so that an image capturing device can capture the one or more images.

7. The method of claim 6, wherein the configuring includes at least some subset of
   positioning a build platform so that one or more of the layers of the object are available to the image capturing device;
   moving a print head so as to not block the image capturing device;
   utilizing sensors to determine if conditions are sufficient to capture high-quality images; and
   adjusting lighting conditions.

8. The method of claim 1, further comprising producing a report documenting irregularities detected in the layers of the object.

9. A three-dimensional (3-D) printer for detecting irregularities during manufacture of an object, the 3-D printer comprising
   an apparatus for manufacturing the object layer by layer based on toolpath instructions for the object, wherein the toolpath instruction provide physical coordinates for the 3D printer to provide material for each layer of the object;

an image capturing device to capture at least one image of each layer of the object as the object is being manufactured; and a processor coupled to a non-transitory computer readable storage medium storing instructions that when executed by the processor causes the processor to for each layer, create a mask of the object by converting the physical coordinates for the 3D printer to pixels based on parameters of the image capturing device;

for each layer, utilize the mask to exclude any part of the at least one captured image for the layer that is not associated with the layer to create at least one masked image for the layer;

for each layer, process the at least one masked image for the layer to detect if the layer has any irregularities, for each layer, document the detected irregularities; and for each layer, determine if the detected irregularities for the layer or for all layers manufactured at that point exceed one or more defined thresholds, wherein the one or more defined thresholds are associated with a risk assessment of structural integrity associated with functional requirements of the object.

10. The 3-D printer of claim 9, wherein the apparatus includes a build platform; and an extruder to extrude a material onto the build platform layer by layer.

11. The 3-D printer of claim 9, wherein the image capturing device is a camera.

12. The 3-D printer of claim 9, wherein when executed the instructions further cause the processor to pre-process the at least one captured image prior to the utilizing the mask, wherein the pre-processing includes at least some subset contrast and brightness adjustment, a matrix operation to remove distortion caused be lens angles, and denoising to smooth out unwanted image details in order to process the at least one image for each layer to detect if the layer has any irregularities.

13. The 3-D printer of claim 9, wherein when executed the instructions cause the processor to perform at least some subset of color conversion, image blurring, morphological operations and image thresholding in order to process the at least one masked image for the layer to detect if the layer has any irregularities.

14. The 3-D printer of claim 9, further comprising sensors to determine if conditions are sufficient to capture precise high-quality images.

15. The 3-D printer of claim 9, further comprising lighting to adjust lighting on the object in order to capture precise high-quality images.

16. The 3-D printer of claim 9, wherein when executed the instructions further cause the processor to produce a report documenting irregularities detected in the layers of the object.

17. The 3-D printer of claim 9, wherein the parameters of the image capturing device include size, pixel resolution and color channel.

18. The 3-D printer of claim 9, wherein the one or more defined thresholds include at least some subset of number of irregularities, size of grouping of irregularities, frequency of irregularities contained in different layers of the object, percentage of layer containing irregularities and percentage of object containing irregularities.

19. The method of claim 4, wherein the pre-processing the captured image includes at least some subset of contrast and brightness adjustment, a matrix operation to remove distortion caused be lens angles, and demising to smooth out unwanted image details.

20. The method of claim 1, wherein the one or more defined thresholds include at least some subset of number of irregularities, size of grouping of irregularities, frequency of irregularities contained in different layers of the object, percentage of layer containing irregularities and percentage of object containing irregularities.

* * * * *